derbrev
UNITED STATES PATENT OFFICE.

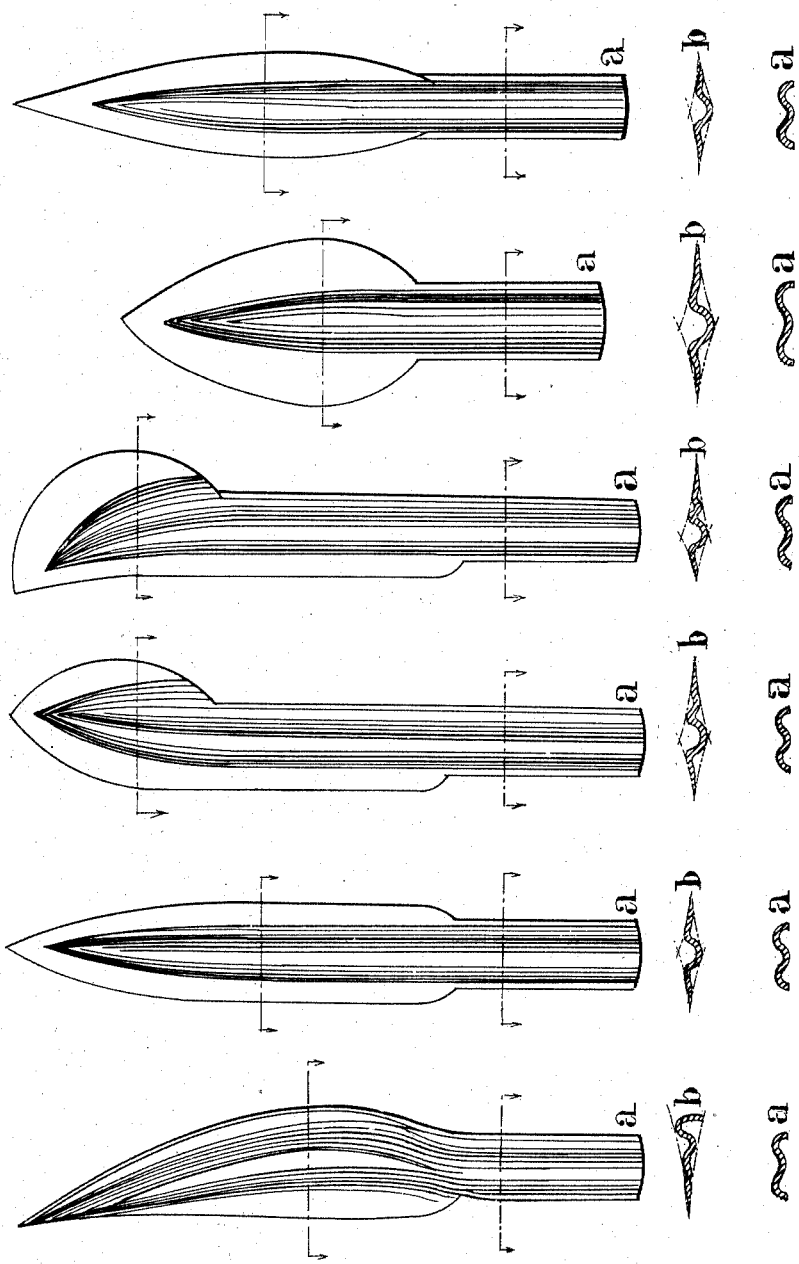

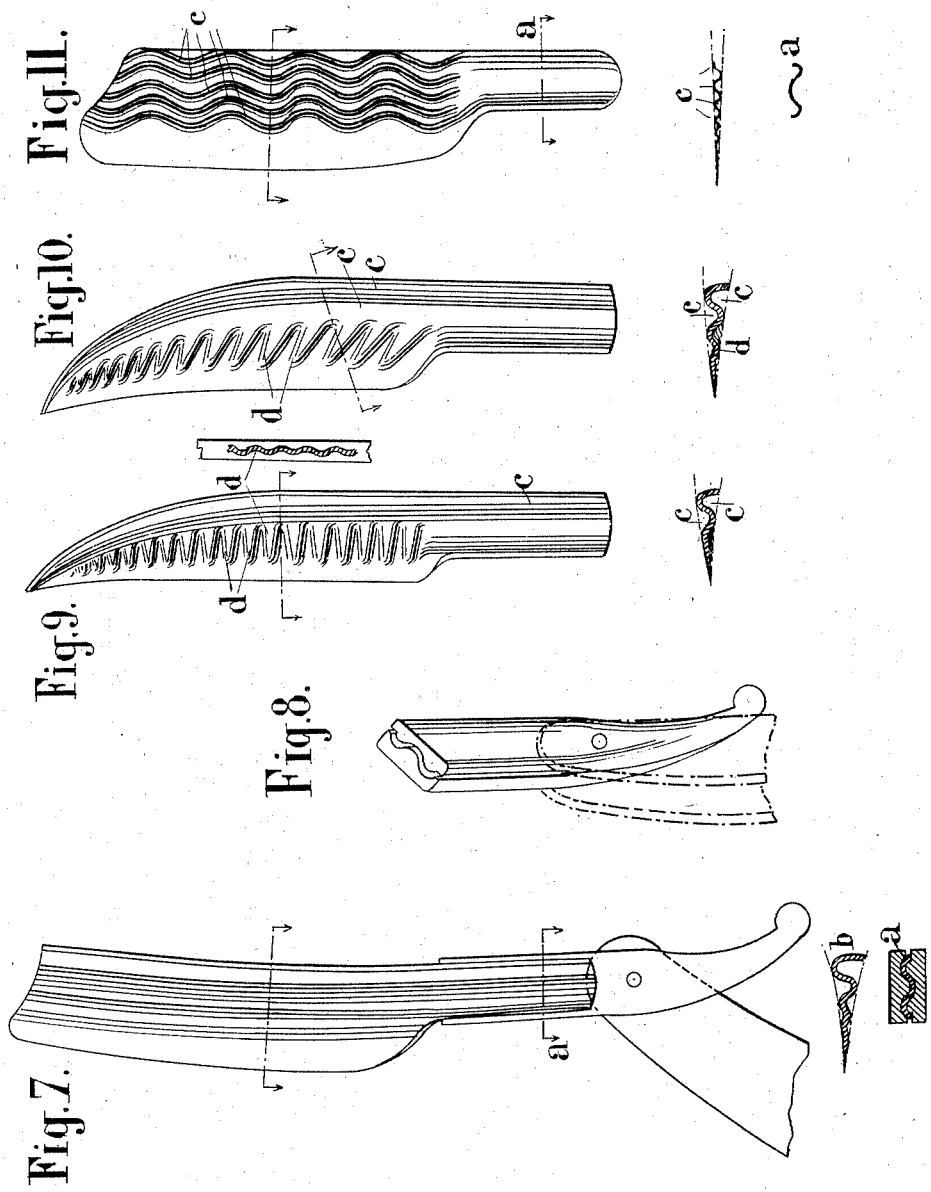

GEORGES THUILLIER, OF NOGENT-EN-BASSIGNY, HAUTE-MARNE, FRANCE.

KNIFE AND OTHER CUTTING BLADE.

No. 864,812.  Specification of Letters Patent.  Patented Sept. 3, 1907.

Application filed February 27, 1906. Serial No. 303,234.

*To all whom it may concern:*

Be it known that I, GEORGES THUILLIER, a citizen of the French Republic, and a resident of Nogent-en-Bassigny, Haute-Marne, France, have invented certain new and useful Improvements in Knife and other Cutting Blades, of which the following is a specification.

This invention relates to a new kind of blade for articles of cutlery, such as erasers, knives, pencil-sharpeners, pruning-knives, bistouries, lancets, corn-cutters, razors, chopping knives and the like.

The blades are of sheet steel and are made by stamping so as to present ribs which insure rigidity: they are provided with a grooved tang or shank enabling them to be fixed in a handle after the manner of pens. The ribs are disposed so as to secure the maximum of stiffness without interfering with the cutting action and to this end the corrugations are made of a variable depth which increases gradually with the distance of the corrugation from the cutting edge; that is to say if the beveled faces of the blade, which intersect to form its cutting edge, be produced or extended backwardly as indicated by dotted lines, in the cross sections $b$ under Figs. 1 to 6, they will just meet the highest points of the corrugations. The blades are thus made as stiff as practicable; for to corrugate them less would weaken them, and to corrugate them more would interfere with the cutting action.

In certain forms of my invention the stiffness of the blades is further increased by varying the direction of the corrugations making them zigzag or curved, instead of rectilinear. The blades thus made are so inexpensive that the substitution of a new blade is more advantageous and more practical than the resharpening of an ordinary blade. The small cost of the blades permits, in the case of razors, lancets, bistouries, corn-cutters, etc. of replacing the blade for each fresh operation so as to avoid the transmission of contagious diseases.

The annexed drawing shows several examples of the invention.

In the examples shown in Figures 1 to 7 the ribs of the blades are longitudinal and form a prolongation of the ribs of the tang $a$ which serves to fix the blade in a suitable handle. The transverse sections $b$ which form part of each of these figures show the formation of the ribs of the blades between the concavities.

Fig. 8 shows in perspective the handle in which is fixed the razor blade of Fig. 7. The ribs may be combined to give rigidity not only in longitudinal direction but also in transverse direction. For this purpose they may, for example, be disposed as indicated in Figs. 9, 10 and 11.

In Fig. 9 the longitudinal ribs $c$ give longitudinal rigidity and the transverse ribs $d$ give rigidity in the direction of breadth.

In Fig. 10 the longitudinal ribs $c$ give rigidity in longitudinal direction and the inclined ribs $d$ give rigidity both in the longitudinal and transverse directions.

Fig. 11 shows a razor blade of hammered steel with undulated longitudinal ribs $c$ which insure rigidity in all directions.

Having now described my invention what I claim and desire to secure by Letters Patent of the United States is:—

1. A sheet metal blade having a cutting edge and corrugations for stiffening the same, said corrugations being of a variable depth which increases gradually with the distance of the corrugations from the said cutting edge.

2. A sheet metal blade having a cutting edge and corrugations for stiffening the same, said corrugations being of a variable depth which increases gradually with the distance of the corrugation from the said cutting edge, said corrugations being, moreover, continued straight and of uniform cross-section to the extreme end of the blade which goes into the handle.

3. A sheet metal blade having a cutting edge and corrugations for stiffening the same, said corrugations being variable in direction and of a variable depth which increases gradually with the distance of the corrugation from the said cutting edge.

4. A sheet metal blade having a cutting edge and corrugations for stiffening the same, said corrugations being curved and of a variable depth which increases gradually with the distance of the corrugation from the said cutting edge.

5. A sheet metal blade having a cutting edge and corrugations for stiffening the same, said corrugations being curved to form parallel waves of a variable depth which increases gradually with the distance of the said corrugation from the said cutting edge.

6. A sheet metal blade having mutually inclined faces that intersect to form a sharp cutting edge and corrugations stamped in the body of the blade to stiffen the same, said corrugations being made deeper as their distance from the cutting edge is greater.

7. A sheet metal blade having a cutting edge and a corrugation formed therein to stiffen the said blade, said corrugation being continuous but variable in direction.

8. A sheet metal blade having a cutting edge and corrugations formed therein to stiffen the said blade, said corrugations being variable in direction and arranged to form a series of substantially parallel but curved waves.

In testimony whereof I have signed my name to this specification in the presence of two subscribing witnesses.

GEORGES THUILLIER.

Witnesses:
 HENRY AUGUSTE BERTIN,
 HANSON C. COXE.